United States Patent
Drennen et al.

(10) Patent No.: US 6,983,829 B2
(45) Date of Patent: *Jan. 10, 2006

(54) MOTOR ACTUATED PARK BRAKE FOR A VEHICLE

(75) Inventors: David B. Drennen, Bellbrook, OH (US); Patrick A. Mescher, Bellbrook, OH (US); Harald Klode, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 337 days.

This patent is subject to a terminal disclaimer.

(21) Appl. No.: 10/040,521

(22) Filed: Jan. 7, 2002

(65) Prior Publication Data

US 2002/0092711 A1 Jul. 18, 2002

Related U.S. Application Data

(60) Provisional application No. 60/261,954, filed on Jan. 16, 2001.

(51) Int. Cl.
*F16D 55/02* (2006.01)
(52) U.S. Cl. .................................. 188/71.2; 188/265
(58) Field of Classification Search ............... 188/71.2, 188/77 R, 265, 82.2, 71.1, 72.1, 75; 192/70.19, 192/70.2, 12 R, 12 D, 150, 84.3, 69.81, 69.82, 192/82 T; 475/2, 214
See application file for complete search history.

(56) References Cited

U.S. PATENT DOCUMENTS

| | | | | |
|---|---|---|---|---|
| 2,849,094 A | * | 8/1958 | Vaiden | 192/69.81 |
| 3,602,345 A | * | 8/1971 | Rattenberg et al. | 192/69.82 |
| 3,659,993 A | * | 5/1972 | Brown, Jr. | 425/214 |
| 3,675,444 A | * | 7/1972 | Whipple | 192/82 T |
| 3,726,373 A | * | 4/1973 | Miller | 192/84.3 |
| 3,742,548 A | * | 7/1973 | Ciaccio | 192/150 |
| 3,769,856 A | * | 11/1973 | Casey | 475/2 |
| 4,022,301 A | * | 5/1977 | Hansen | 188/72.1 |
| 4,773,210 A | * | 9/1988 | Landwehrkamp et al. | 188/75 |
| 4,846,326 A | * | 7/1989 | Tilton et al. | 192/70.2 |
| 5,620,077 A | * | 4/1997 | Richard | 192/12 D |
| 5,709,032 A | * | 1/1998 | Mizutani et al. | 188/77 R |
| 6,267,211 B1 | * | 7/2001 | Heintzmann et al. | 192/12 R |
| 6,401,879 B1 | | 6/2002 | Drennen et al. | |
| 6,405,838 B1 | | 6/2002 | Shaw | |
| 6,435,320 B1 | | 8/2002 | Drennen et al. | |
| 6,500,093 B2 | * | 12/2002 | Genise et al. | 477/109 |
| 6,550,598 B2 | | 4/2003 | Drennen | |
| 6,552,967 B1 | | 4/2003 | Tsutsui et al. | |
| 6,802,398 B2 | * | 10/2004 | Drennen et al. | 188/2 D |

\* cited by examiner

*Primary Examiner*—Melanie Torres
(74) *Attorney, Agent, or Firm*—Michael D. Smith

(57) ABSTRACT

The problem of reliably locking an electrically actuated park brake is resolved through the use of a jaw-tooth clutch operatively installed between the shaft and the housing of a drive motor, for engaging the brake. The brake may be locked and unlocked by selectively engaging the jaw-tooth clutch either electrically or manually.

24 Claims, 3 Drawing Sheets

MOTOR ACTUATED PARK BRAKE FOR A VEHICLE

RELATED APPLICATION

This application claims priority to U.S. Provisional Application Ser. No. 60/261,954 filed on Jan. 16, 2001 entitled "INTEGRAL MOTOR ACTUATED PARK BRAKE FOR ELECTRIC PARK BRAKE ACTUATOR SYSTEMS" by David B. Drennen, et al, the entire disclosure of which is incorporated by reference, herein.

TECHNICAL FIELD OF THE INVENTION

This invention relates to vehicle brakes, and more particularly to electrically actuated emergency/parking brakes.

BACKGROUND OF THE INVENTION

A typical vehicle brake system includes an emergency/park brake apparatus that is used to hold the vehicle in position while it is parked, or to stop the vehicle in the event the primary braking system fails. In some modern vehicles, the emergency/park brake apparatus is electrically actuated. In such an electrically actuated brake apparatus, an electrical drive motor is used to drive a ball screw, or other drive device, to engage the brake. When electrical power is removed from the motor, however, spring forces inherent in the brake apparatus can cause back-driving of the drive device and drive motor, thereby releasing the brake. Vibration increases this inherent tendency.

What is needed, therefore, is an improved electrically actuated brake apparatus that can be locked against release when power is removed. It is also desirable that the brake assembly have provisions for unlocking and releasing the brake apparatus, should the drive motor or the power source connected to the drive motor malfunction.

SUMMARY OF THE INVENTION

Our invention provides an improved method and apparatus for electrically actuating a brake, thereby allowing the brake to be selectively locked against release when power is removed, through the use of a jaw-tooth clutch operatively installed between the shaft and the housing of a drive motor, for engaging the brake. Various forms of our invention also provide for unlocking and releasing the brake, should the drive motor or the power source connected to the drive motor malfunction.

In one form of our invention, a brake apparatus includes a drive motor having a shaft that is rotatable about an axis for actuation of the brake, and a jaw-tooth clutch for selectively locking the shaft against rotation about the axis. The drive motor may include a housing disposed about the shaft. The jaw-tooth clutch may include a rotating jaw operatively attached to the shaft for rotation about the axis, and a translating jaw operatively connected to the housing for non-rotatable translation along the axis and into engagement with the rotating jaw. The rotating and translating jaws each may have axially directed mating teeth affixed on mating surfaces of the jaws, for locking the shaft against rotation about the axis.

The apparatus may include provisions for moving the translating jaw along the axis, including a cam shaft disposed about the shaft of the drive motor and rotatable independently thereof about the axis, with the cam shaft having on an outer periphery thereof a cam surface. The translating jaw may include a bore therein configured for passage of the cam shaft, with the bore defining a ramp surface configured for mating engagement with the cam surface of the cam shaft.

The cam surface and ramp surface are configured with complimentary profiles, such that rotation of the cam shaft in a first direction about the axis causes the cam surface to engage the ramp surface and drive the translating jaw away from the rotating jaw, and such that rotation of the camshaft in a second direction about the axis causes the cam surface to disengage from driving engagement with the ramp surface, thereby allowing the translating jaw to move toward the rotatable jaw. The brake apparatus may also include a spring for biasing the translating jaw toward engagement with the rotating jaw of the jaw-tooth clutch.

In another form of our invention, a brake apparatus may include a drive motor adapted for receiving power from a first power source and having a shaft that is rotatable about an axis for actuation of the brake means. A jaw-tooth clutch is adapted for selectively locking the shaft against rotation about the axis. A clutch actuation motor is adapted for receiving power from a second power source independent from the first power source, and is operatively connected to the jaw tooth clutch for driving the jaw-tooth clutch to selectively lock the shaft against rotation about the axis. The brake apparatus may also include provisions, such as a cable release, for manually unlocking the jaw-tooth clutch.

Our invention may also take the form of a method for operating a brake using the apparatus described herein.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

DETAILED DESCRIPTION OF THE PRESENTLY PREFERRED EMBODIMENTS

Figure 1:
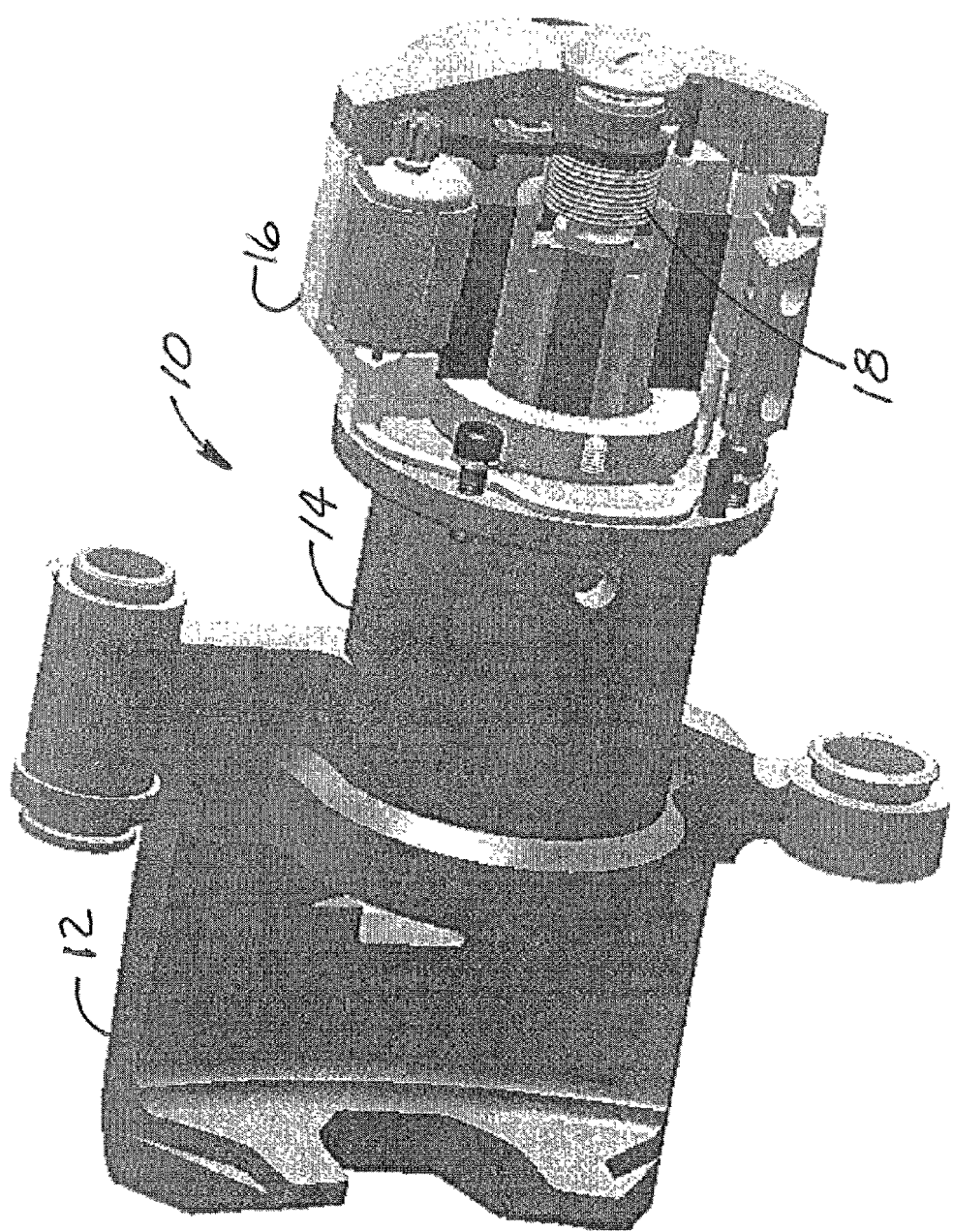
FIG. 1 is a perspective view of an exemplary embodiment of a brake apparatus according to our invention.
Figure 2:
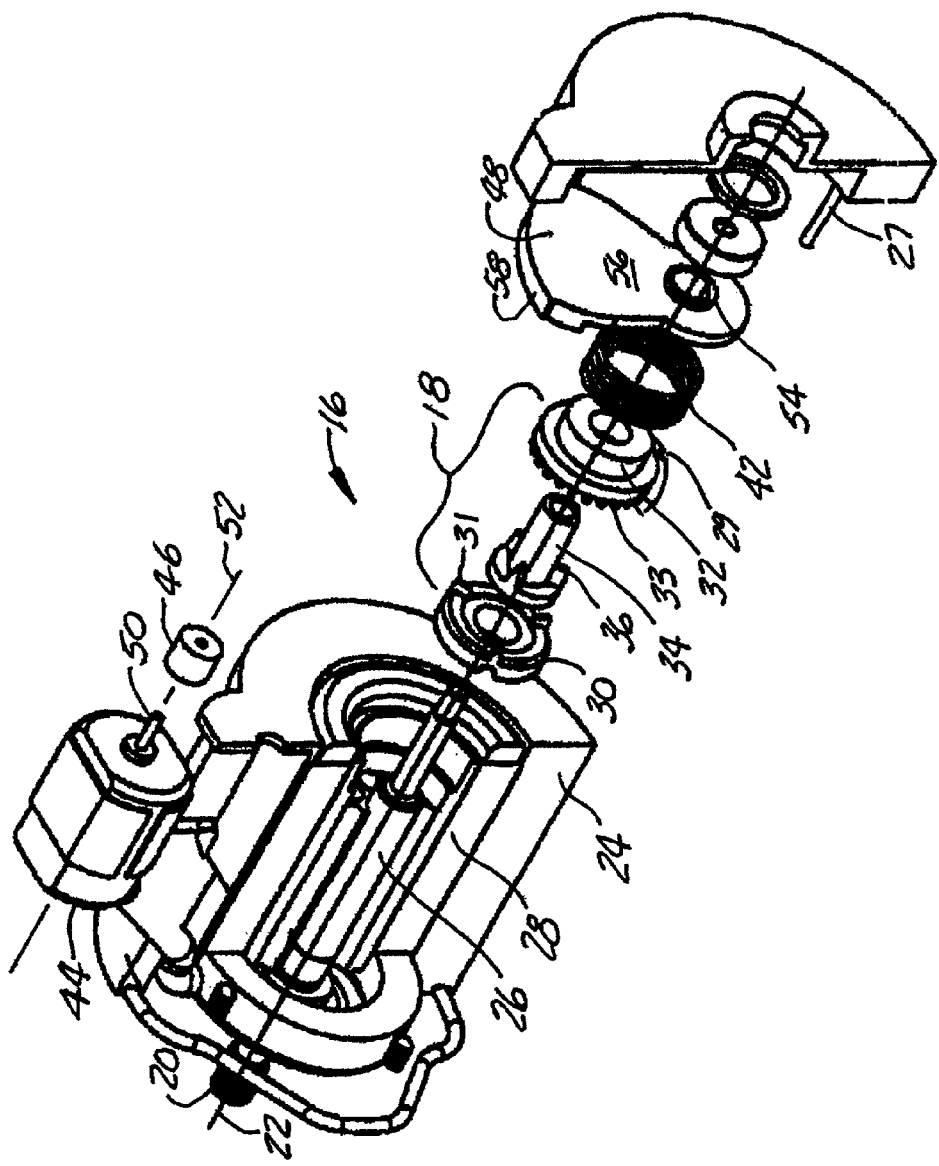
FIG. 2 is an exploded perspective view of a portion of the apparatus depicted in FIG. 1, according to our invention.

FIGS. 1 and 2 depict an exemplary for of a brake apparatus 10, according to our invention, having brake means, in the form of a disk brake caliper 12, a drive train 14, an electric drive motor 16, and a jaw-tooth clutch 18. The drive motor 16 has a shaft 20 that is rotatable about an axis 22 and operatively attached to the drive train 14 for actuation of the disk brake caliper 12 by rotation of the shaft 20. The jaw-tooth clutch 18 is configured for selectively locking the shaft 20 against rotation about the axis 22.

The drive motor 16 includes a housing 24 disposed about the shaft 20. The drive motor further includes a rotor 26 affixed to the shaft 20, and a stator 28 disposed about the rotor 26 and affixed to the housing 24. The drive motor stator 28 is adapted to receive electrical current from a first power source (not shown). Providing electrical power to the stator 28 causes the rotor 26 to drive the shaft 20 in a first direction about the axis 22 for engaging the brake 12, or in a second direction for disengaging the brake 12. The direction of rotation of the shaft 20 is determined by the nature and polarity of the electrical current signal provided to the stator 28.

The jaw-tooth clutch 18 includes a rotating jaw 30 operatively attached to the shaft 20 for rotation about the axis 22, and a translating jaw 32 operatively connected to the housing 24 for non-rotatable translation along the axis 22 and into engagement with the rotating jaw 30. The rotating and translating jaws 30, 32 each have axially directed mating teeth 31, 33 affixed on mating surfaces of the jaws 30, 32 that allow the jaw-tooth clutch to lock the shaft 20 against rotation about the axis 22. The rotating jaw 30 is affixed to the right end, as shown in FIG. 2, of the rotor 26 of the drive motor 16.

It is preferable that the translating jaw 32 be made from a suitable material, and that the teeth 33 on the translating jaw 32 be configured such that, if the clutch 18 should ever inadvertently engage, the drive motor 16 have sufficient torque to shear off the teeth 33. In this manner, although the locking function of the jaw tooth clutch 18 would be lost, the brake apparatus 10 would remain otherwise operable. We contemplate that a polymer material, such as NYLON, would be well suited for fabricating the translating jaw 32, to allow the teeth 33 to be sheared off by the drive motor 16 following an inadvertent engagement of the clutch 18.

A cam shaft 34 is disposed about the shaft 20 of the drive motor 16 and has a bore for passage of the shaft 20. The bore provides a clearance fit with the shaft 20, so that the cam shaft 34 and shaft 20 are rotatable independently from one another, about the axis 22.

Figure 3:
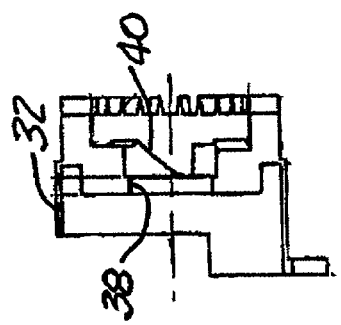
FIGS. 3–5 are views of component parts of a jaw-tooth clutch assembly used for locking the brake apparatus of FIG. 1, and a mechanism for engaging and disengaging the jaw-tooth clutch, according to our invention.
Figure 4:
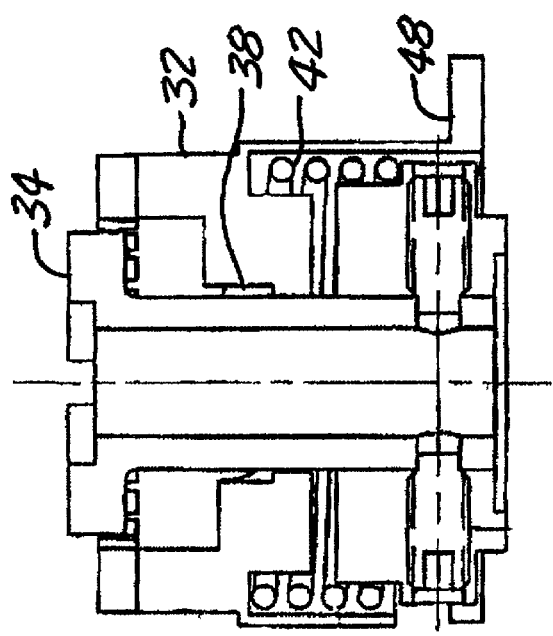

As shown in FIGS. 2, 3, and 4, the cam shaft 34 has an outer periphery configured to provide a cam surface in the form of three axially extending lugs 36. The translating jaw 32 includes a bore 38 therein configured for sliding passage of the cam shaft 34. The bore 38 of the translating jaw 32 defines a ramp surface 40 configured for mating engagement with the lugs 36 forming the cam surface of the cam shaft 34. The lugs 36 and the ramp surface 40 are cooperatively configured such that rotation of the cam shaft in a clockwise direction about the axis 22, as viewed from the right end of the drive motor 16 as depicted in FIG. 2, causes the lugs 36 to engage the ramp surface 40 and drive the translating jaw 32 away from the rotating jaw 30. Rotation of the camshaft 34 in a counter-clockwise direction about the axis 22 causes the lugs 36 to move into the bore 38 of the translating jaw 32 along the ramp surface 40, and effectively disengage from driving engagement with the ramp surface 40 in a manner allowing the translating jaw 32 to move toward the rotatable jaw 30. A spring 42 provides a biasing force urging the translating jaw 32 to move toward engagement with the rotating jaw 30 of the jaw-tooth clutch 18. A guide pin 27 extends from the housing 24 and slidingly engages a slot 29 in the translating jaw 32 to prevent the translating jaw 32 from rotating about the axis 22.

It is preferred that the spring 42 provide sufficient preload to keep the translating jaw 32 clamped against the rotating jaw 30 while the clutch 18 is engaged, against inadvertent separation due to external forces such as vibration. Such vibration might be caused, for example, by an impact wrench applied to the vehicle lug nuts during a tire change or maintenance and repair operations. It could be undesirable in such circumstances to have the brake apparatus 10 unlock due to disengagement of the clutch 18.

Figure 5:
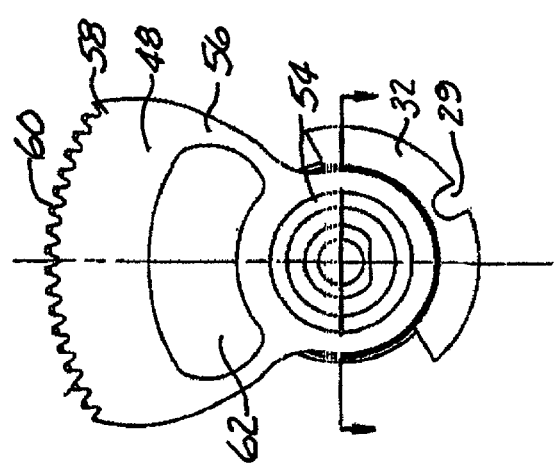

The brake apparatus 10 further includes both electrical and manual clutch drive means for rotating the cam shaft 34 in a first and a second direction about the axis 22. A clutch actuation motor 44 is operatively attached to the cam shaft 34 by a pinion 46 and a sector gear 48 for rotating the cam shaft 34 in the first and second directions about the axis 22. The clutch actuation motor 44 includes a shaft 50 extending therefrom and rotatable about a second axis 52, extending parallel to the axis 22 of the drive motor 16. The sector gear 48 has a hub 54 for attachment to the cam shaft 34, and a web 56 extending radially outward from the hub 54 to a rim 58 having the gear teeth 60 extending therefrom, as shown in FIG. 5, for engagement with the pinion 46.

The spring 42, in the form of a helical compression spring, is disposed between the translating jaw 32 of the jaw-tooth clutch 18 the sector gear 48. The web 56 of the sector gear 48 includes a slot 62 adapted for attachment of a manually operable brake release cable (not shown) allowing the sector gear 48 to be used as a cable-operated lever for rotating the cam shaft 34 to disengage the jaw tooth clutch 18, in the event that the clutch actuation motor 44 loses power or malfunctions.

The brake 12 is engaged and locked by rotating the shaft 20 of the drive motor 16 in a direction causing the drive train 14 to engage the brake, by applying power from the first power source to the drive motor 16, and, after the brake 12 is engaged, applying power to the clutch actuation motor 44 to rotate the sector gear 48 and cam shaft 34 in a first direction about the axis 22 for moving the translating jaw 32 into engagement with the rotating jaw 30, to thereby lock the shaft 20 against rotation about the axis 22. This process is reversed to unlock the jaw-tooth clutch 18 and disengage the brake 12.

It is preferable that the clutch actuation motor 44 be driven from a power source that is independent from the power source used for driving the drive motor 16, so that the jaw-tooth clutch 18 can still be unlocked with the clutch actuation motor 44 if power is lost from the power source used for driving the drive motor 16.

We also contemplate a method of operation wherein power is not maintained to the drive motor 16 after the shaft 20 is locked by the jaw-tooth clutch 18, to thereby conserve electrical power. It is also not necessary to maintain power to the clutch actuation motor 44 after the shaft is locked, because the jaw-tooth clutch 18 locks the shaft 20 in position against being back driven or moving as a result of vibration.

To ensure that the teeth 31, 33 on the rotating and translating jaws 30, 32 fully engage, we contemplate a method of operation including rotating the shaft 20 of the drive motor 16 through an additional angular distance after moving the translating jaw 32 into engagement with the rotating jaw 30, to thereby ensure locking engagement of the rotating and translating jaws 30, 32.

Those having skill in the art will recognize that, while we presently consider it preferable to have the components according to our invention arranged as described above, we contemplate many other arrangements within the scope of our invention.

In summary therefore, while the embodiments of our invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

We claim:

1. A brake apparatus comprising:
brake means including a drive motor having a shaft that is rotatable about an axis for actuation of the brake means; and
jaw-tooth clutch means for selectively locking the shaft against rotation about the axis;
the drive motor including a housing disposed about the shaft;
the jaw-tooth clutch means including a rotating jaw operatively attached to the shaft for rotation about the axis, and a translating jaw operatively connected to the housing for non-rotatable translation along the axis and into engagement with the rotating jaw, the rotating and translating jaws each having axially directed mating teeth affixed on mating surfaces of the jaws, the jaw-tooth clutch thereby locking the shaft against rotation about the axis.

2. A brake apparatus comprising:
brake means including a drive motor having a shaft that is rotatable about an axis for actuation of the brake means; and
jaw-tooth clutch means for selectively locking the shaft against rotation about the axis;
the drive motor including a housing disposed about the shaft; and
the jaw-tooth clutch means including a rotating jaw operatively attached to the shaft for rotation about the axis, and a translating jaw operatively connected to the housing for non-rotatable translation along the axis and into engagement with the rotating jaw, the rotating and translating jaws each having axially directed mating teeth affixed on mating surfaces of the jaws, the jaw-tooth clutch thereby locking the shaft against rotation about the axis,
the teeth on the translating jaw being configured such that they can be sheared off by the drive motor following an inadvertent engagement of the jaw-tooth clutch, to thereby provide means for actuating the brake means should the jaw tooth clutch means malfunction.

3. A brake apparatus comprising:
brake means including a drive motor having a shaft that is rotatable about an axis for actuation of the brake means;
jaw-tooth clutch means for selectively locking the shaft against rotation about the axis;
the drive motor including a housing disposed about the shaft;
the jaw-tooth clutch means including a rotating jaw operatively attached to the shaft for rotation about the axis, and a translating jaw operatively connected to the housing for non-rotatable translation along the axis and into engagement with the rotating jaw, the rotating and translating jaws each having axially directed mating teeth affixed on mating surfaces of the jaws, the jaw-tooth clutch thereby locking the shaft against rotation about the axis; and
means for moving the translating jaw along the axis for selectively engaging and disengaging the mating teeth of the jaws of the jaw-tooth clutch.

4. The apparatus of claim 3 wherein:
the means for moving the translating jaw along the axis includes a cam shaft disposed about the shaft of the drive motor and rotatable independently thereof about the axis, the cam shaft having on an outer periphery thereof a cam surface; and
the translating jaw includes a bore therein configured for passage therethrough of the cam shaft, the bore defining a ramp surface configured for mating engagement with the cam surface of the cam shaft,
the cam surface and ramp surface being cooperatively configured such that rotation of the cam shaft in a first direction about the axis causes the cam surface to engage the ramp surface and drive the translating jaw away from the rotating jaw, and rotation of the camshaft in a second direction about the axis causes the cam surface to disengage from driving engagement with the ramp surface, thereby allowing the translating jaw to move toward the rotatable jaw.

5. The apparatus of claim 4 further including spring means for biasing the translating jaw toward engagement with the rotating jaw of the jaw-tooth clutch.

6. The apparatus of claim 5 wherein the spring means provides a preload for maintaining engagement of the clutch means following engagement of the jaw-tooth clutch.

7. The apparatus of claim 4 further including means for rotating the cam shaft in a first and a second direction about the axis.

8. The apparatus of claim 7 wherein the means for routing the cam shaft includes means for manually rotating the cam shaft.

9. The apparatus of claim 7 wherein the means for rotating the cam shaft about the axis includes lever means having a hub thereof attached to the cam shaft and an arm extending radially outward from the hub to a distal end of the arm adapted for application of a force for rotating the hub of the lever means and the cam shaft in a first and a second direction about the axis.

10. The apparatus of claim 9 further including compression spring means disposed between the translating jaw and the lever means.

11. The apparatus of claim 7 wherein the means for rotating the cam shaft includes a clutch actuation motor operatively attached to the cam shaft by clutch drive means for rotating the cam shaft in the first and second directions about the axis.

12. The apparatus of claim 11 wherein:
the clutch actuation motor includes a shaft extending therefrom and rotatable about a second axis; and
the clutch drive means includes gear teeth operatively extending from the cam shaft, and a pinion affixed to the clutch actuation motor shaft, the pinion having gear teeth in mating engagement with the gear teeth extending from the cam shaft such that rotation of the shaft of the clutch actuation motor about the second axis rotates the cam shaft about the first axis, to thereby selectively engage and disengage the jaw-tooth clutch.

13. The apparatus of claim 12 wherein the second axis and the axis of drive motor are substantially parallel.

14. The apparatus of claim 12 wherein the clutch drive means includes a sector gear having a hub for attachment to the cam shaft and a web extending radially outward from the hub to a rim having the gear teeth extending therefrom for engagement with the pinion.

15. The apparatus of claim 14 further including compression spring means disposed between the translating jaw of the jaw-tooth clutch and the sector gear.

16. The apparatus of claim 14 further including means for attaching a manual release cable mechanism to the sector gear for rotating the sector gear about the axis to release the jaw-tooth clutch.

17. A brake apparatus comprising:
brake means including a drive motor adapted for receiving power from a first power source and having a shaft that is rotatable about an axis for actuation of the brake means;
jaw-tooth clutch means for selectively locking the shaft against rotation about the axis; and
a clutch actuation motor adapted for receiving power from a second power source independent from the first power source, and operatively connected to the jaw tooth clutch means for driving the jaw-tooth clutch means for selectively locking the shaft against rotation about the axis.

18. The apparatus of claim 17 wherein:
the drive motor includes a housing disposed about the shaft; and
the jaw-tooth clutch means includes a rotating jaw operatively attached to the shaft for rotation about the axis, and a translating jaw operatively connected to the housing for non-rotatable translation along the axis and into engagement with the rotating jaw, the rotating and translating jaws each having axially directed mating teeth affixed on mating surfaces of the jaws, the jaw-tooth clutch thereby locking the shaft against rotation about the axis.

19. The brake apparatus of claim 18 further comprising means for manually unlocking the jaw-tooth clutch.

20. A method for operating a brake apparatus including a drive motor adapted for receiving power from a first power source, having a shaft that is rotatable about an axis for actuation of the brake apparatus and a housing disposed about the shaft; the method comprising:
operatively attaching a rotating jaw of a jaw-tooth clutch to the shaft for rotation about the axis;
operatively connecting a translating jaw of the jaw-tooth clutch to the housing for non-rotatable translation along the axis and into engagement with the rotating jaw, the rotating and translating jaws each having axially directed mating teeth affixed on mating surfaces of the jaws;
rotating the shaft of the drive motor for engaging the brake apparatus by applying power from the first power source to the drive motor; and
moving the translating jaw into engagement with the rotating jaw for, locking the shaft against rotation about the axis.

21. The method of claim 20 further comprising moving the translating jaw out of engagement with the rotating jaw for unlocking the shaft and allowing rotation of the shaft about the axis.

22. A method for operating a brake apparatus including a drive motor adapted for receiving power from a first power source, having a shaft that is rotatable about an axis for actuation of the brake apparatus and a housing disposed about the shaft; the method comprising:
operatively attaching a rotating jaw of a jaw-tooth clutch to the shaft for rotation about the axis;
operatively connecting a translating jaw of the jaw-tooth clutch to the housing for non-rotatable translation along the axis and into engagement with the rotating jaw, the rotating and translating jaws each having axially directed mating teeth affixed on mating surfaces of the jaws;
rotating the shaft of the drive motor for engaging the brake apparatus by applying power from the first power source to the drive motor;
moving the translating jaw into engagement with the rotating jaw for, locking the shaft against rotation about the axis; and
moving the translating jaw with a second drive motor having a power source independent from the first power source.

23. A method for operating a brake apparatus including a drive motor adapted for receiving power from a first power source, having a shaft that is rotatable about an axis for actuation of the brake apparatus and a housing disposed about the shaft; the method comprising:
operatively attaching a rotating jaw of a jaw-tooth clutch to the shaft for rotation about the axis;
operatively connecting a translating jaw of the jaw-tooth clutch to the housing for non-rotatable translation along the axis and into engagement with the rotating jaw, the rotating and translating jaws each having axially directed mating teeth affixed on mating surfaces of the jaws;
rotating the shaft of the drive motor for engaging the brake apparatus by applying power from the first power source to the drive motor;
moving the translating jaw into engagement with the rotating jaw for, locking the shaft against rotation about the axis; and
rotating the shaft of the drive motor through an additional angular distance after moving the translating jaw into engagement with the rotating jaw, to thereby ensure locking engagement of the rotating and translating jaws.

24. The method of claim 23 further comprising removing power from the drive motor after moving the translating jaw into engagement with the rotating jaw of the jaw-tooth clutch.

* * * * *